United States Patent
Kohayashi et al.

(10) Patent No.: US 9,460,850 B2
(45) Date of Patent: Oct. 4, 2016

(54) FERRITE MAGNETIC POWDER FOR BOND MAGNET AND MANUFACTURING METHOD OF THE SAME, AND BOND MAGNET

(71) Applicants: DOWA F-TEC CO., LTD., Kume-gun, Okayama (JP); DOWA ELECTRONICS MATERIALS CO., LTD., Tokyo (JP)

(72) Inventors: Shuichi Kohayashi, Tokyo (JP); Hiroya Ikeda, Okayama (JP); Hideki Katayama, Okayama (JP); Keisuke Ayabe, Okayama (JP)

(73) Assignees: DOWA F-TEC CO., LTD., Okayama (JP); DOWA ELECTRONICS MATERIALS CO., LTD., Tokyo (JP)

( * ) Notice: Subject to any disclaimer, the term of this patent is extended or adjusted under 35 U.S.C. 154(b) by 71 days.

(21) Appl. No.: 14/255,621

(22) Filed: Apr. 17, 2014

(65) Prior Publication Data

US 2014/0225316 A1 Aug. 14, 2014

Related U.S. Application Data

(62) Division of application No. 12/225,235, filed as application No. PCT/JP2007/054336 on Mar. 6, 2007, now abandoned.

(30) Foreign Application Priority Data

Mar. 31, 2006 (JP) ................................ 2006-096749
Feb. 9, 2007 (JP) ................................ 2007-031074

(51) Int. Cl.
*H01F 1/11* (2006.01)
*H01F 41/02* (2006.01)
(Continued)

(52) U.S. Cl.
CPC ....... *H01F 41/0266* (2013.01); *C01G 49/0018* (2013.01); *C01G 49/0036* (2013.01);
(Continued)

(58) Field of Classification Search
CPC ................ C04B 2235/3241; C04B 2235/763; C04B 35/26; C04B 35/2633; C04B 35/2641; C04B 35/2683; H01F 1/0315; H01F 1/11; H01F 1/344; H01F 1/36; H01F 1/445; H01F 41/0266; C01P 2006/42
USPC ................ 252/62.63, 62.55, 62.56; 264/611
See application file for complete search history.

(56) References Cited

U.S. PATENT DOCUMENTS

| | | | | |
|---|---|---|---|---|
| 4,493,874 A | * | 1/1985 | Kubo | B82Y 30/00 252/62.58 |
| 5,378,384 A | * | 1/1995 | Hopstock | B82Y 30/00 252/62.56 |

(Continued)

FOREIGN PATENT DOCUMENTS

| | | |
|---|---|---|
| JP | A-01-268001 | 10/1989 |
| JP | A-1-268001 | 10/1989 |

(Continued)

OTHER PUBLICATIONS

English translation of JP01-268001A, received Nov. 2011, 11 pages.*

(Continued)

*Primary Examiner* — Matthew E Hoban
*Assistant Examiner* — Lynne Edmondson
(74) *Attorney, Agent, or Firm* — Oliff PLC (57) ABSTRACT

To provide ferrite magnetic powders for bond magnet capable of surely suppressing residual hexavalent chrome, being an environmental load substance, having no adverse influence on the magnetic characteristics, which is an obstacle in use, and without damaging productivity and at a low cost. The method includes the steps of obtaining sintered powders by sintering raw material powders; wet-pulverizing the sintered powders; wet-cleaning the sintered powders; and annealing the cleaned sintered powders, wherein in the step of the wet-pulverization and in the step of wet-cleaning, generation of the hexavalent chrome, being an environmental load substance, is suppressed by performing the pulverization and cleaning while maintaining pH of a dispersion solvent at 8.5 or less, at the time of pulverization and cleaning.

7 Claims, 1 Drawing Sheet

(51) Int. Cl.
*C01G 49/00* (2006.01)
*H01F 1/113* (2006.01)

(52) U.S. Cl.
CPC ........... *H01F1/113* (2013.01); *C01P 2006/10* (2013.01); *C01P 2006/11* (2013.01); *C01P 2006/42* (2013.01); *C01P 2006/80* (2013.01)

(56) References Cited

U.S. PATENT DOCUMENTS

| | | | |
|---|---|---|---|
| 5,866,028 A * | 2/1999 | Toyota | C04B 35/2683 252/62.59 |
| 2001/0023933 A1 | 9/2001 | Ogata et al. | |
| 2004/0053075 A1* | 3/2004 | Oda | C01G 49/009 428/692.1 |
| 2004/0121188 A1 | 6/2004 | Oda et al. | |
| 2006/0091352 A1 | 5/2006 | Nagaoka et al. | |
| 2006/0284136 A1 | 12/2006 | Takami et al. | |
| 2008/0226489 A1* | 9/2008 | Sakata | B22F 3/101 419/38 |

FOREIGN PATENT DOCUMENTS

| | | |
|---|---|---|
| JP | A-08-026733 | 1/1996 |
| JP | A-09-260124 | 10/1997 |
| JP | A-11-251127 | 9/1999 |
| JP | A-2001-035715 | 2/2001 |
| JP | 2001160506 A * | 6/2001 |
| JP | B-3257936 | 2/2002 |
| JP | A-2003-086412 | 3/2003 |
| RU | 2 111 571 C1 | 5/1998 |

OTHER PUBLICATIONS

Bibby Scientific Technical Note: T11-001, Water Stills, pH of Distilled water, web page, http://www.stuart-equipment.com/adminimages/t11_001_ph_of_distilled_water.pdf, printed Aug. 21, 2015.*

Machine translation of JP2001160506A, printed Feb. 1, 2016, 4 pages.*

European Search Report dated Jun. 29, 2010 in European Patent Application No. 07737883.4.

* cited by examiner

FERRITE MAGNETIC POWDER FOR BOND MAGNET AND MANUFACTURING METHOD OF THE SAME, AND BOND MAGNET

CROSS-REFERENCE TO PRIOR APPLICATION

This is a divisional of application Ser. No. 12/225,235 filed Nov. 26, 2008, which is a National Stage Application of PCT/JP2007/054336 filed Mar. 6, 2007, and claims the benefit of Japanese Patent Application No. 2006-096749 filed Mar. 31, 2006 and Japanese Patent Application No. 2007-031074 filed Feb. 9, 2007. The disclosures of the prior applications are hereby incorporated by reference herein in their entirety.

TECHNICAL FIELD

The present invention relates to ferrite magnetic powder for bond magnet containing iron and an alkaline earth metal as composite elements and a manufacturing method of the same, and a bond magnet using a magnetic component of this ferrite magnetic powder.

DESCRIPTION OF RELATED ART

A bond magnet is a compound permanent magnet obtained by compacting magnetic powders by a binder such as rubber and resin, with this magnetic (hard magnetic body) powder set as a filler, having advantages such as a high free degree of shape and a proof against fracture in mechanical characteristics, and having further advantages such as easy mass production by mold molding and excellent productivity.

Therefore, there are significantly wide-ranging application products of the bond magnet, which are widely utilized, for example, in a door packing of a refrigerator, each kind of magnet sheet, a spindle motor of peripheral equipment of a personal computer, each kind of meter of automobile, healthcare equipment, stationary, toys, etc.

Usually, ferrite magnetic powder having excellent residual magnetic flux density and intrinsic coercive force is used as the magnetic powder, being the filler of this bond magnet. Various kinds of ferrite magnetic powders for bond magnet have been developed as described in patent documents 1 and 2.

A ferrite magnetic material includes iron and an alkaline earth metal as composite elements in many cases, and the same thing can be said for the case of the ferrite magnetic powder for bond magnet. $BaO.6Fe_2O_3$ and $SrO.6Fe_2O_3$, etc, are given as examples of this kind of ferrite magnetic material, and these materials are also used as the ferrite magnetic powder for bond magnet.

This ferrite magnetic powder for bond magnet is manufactured through the following steps.
(1) The step of obtaining sintered powder by sintering raw material powders containing the iron and alkaline earth metal.
(2) The step of pulverizing the sintered powders obtained in the step (1).
(3) The step of cleaning the sintered powders pulverized in the step (2).
(4) The step of annealing the cleaned sintered powders in the step (3).
Patent document 1: Publication of U.S. Pat. No. 3,257,936
Patent document 1: Japanese Patent Laid Open Publication No. 2003-86412

DISCLOSURE OF THE INVENTION

Problem to be Solved by the Invention

In recent years, there is a severe request to electric/electronic products, such as a request to characteristics capable of coping with its purpose of use and in addition a request to the cost. Further, in recent years, from the viewpoint of an environmental problem, a product with small environmental load is desired.

Inventors of the present invention consider it industrially important that magnetic characteristic close to a sintered isotropic magnet is exhibited by the bond magnet which is widely used in various electric/electronic products. Therefore, the inventors of the present invention study on the invention of the bond magnet having the magnetic characteristic close to the sintered isotropic magnet. Then, as a result of the study, the inventors of the present invention achieve a technique of improving the magnetic characteristic of the bond magnet, by containing small amount of Cr (chrome) in the bond magnet. This is because when a moderate amount of Cr is contained in the ferrite magnetic powder, being the raw material of the bond magnet, dispersibility is improved, and flowability at the time of mixing the ferrite magnetic powder, binder resin, and rubber is improved. Also, this is because when the flowability is improved, as a result, orientation of the ferrite magnetic powder is increased, and the magnetic characteristic is improved in the manufactured bond magnet.

However, hexavalent chrome, being an environmental load substance, is sometimes detected in the manufactured bond magnet. However, the hexavalent chrome of an amount below environmental criteria is remained in the bond magnet, there is nothing to be concerned about environmental contamination immediately. However, as described above, the bond magnet is utilized in significantly various kinds of and large amount of electric/electronic products. Therefore, the inventors of the present invention consider it necessary to reduce the amount of the hexavalent chrome, being the environmental load substance, as much as possible, without deteriorating the magnetic characteristic of the bond magnet.

Under such a circumstance, the present invention is provided, and an object of the present invention is to provide ferrite magnetic powder capable of manufacturing bond magnet having high characteristic, because the flowability is high at the time of mixing with the binder resin and binder rubber, and capable of reducing hexavalent chrome to a detection limit or less, in the manufactured bond magnet.

Means to Solve the Problem

The inventors of the present invention study on a cause of detecting the hexavalent chrome for bond magnet, and the following points are clarified.

As described above, the manufacturing step of the ferrite magnetic powders for manufacturing a bond magnet includes at least one of the step of cleaning the sintered powders containing suitable amount of Cr element obtained by sintering the raw material powders, and the step of wet-pulverizing the sintered powders. The cleaning step and the wet-pulverizing step are generally performed, by using water as a solvent (dispersion solvent).

By adding the wet cleaning step, in the manufactured ferrite magnetic powders, non-reacted impurity components are eluted into the solvent and removed. Then, when the annealing process is performed thereafter, coagulation among particles and grain growth are tremendously suppressed. Therefore, by adding heat in this annealing process, a strain in crystal generated during pulverization is removed, thus recovering the magnetic characteristic and maintaining the dispersibility among particles in the ferrite magnetic powders containing a suitable amount of Cr element. Accordingly, when mixed with natural rubber, resin, and rubbers, being binders, the ferrite magnetic powders are uniformly dispersed into these binders, thus improving flowability and orientation of the ferrite magnetic powders in this mixed material. As a result, in the step thereafter, when injection molding of the mixed material is performed in a magnetic field, an individual ferrite magnetic powder particle is further uniformly oriented, and therefore magnetic force is improved in the manufactured bond magnet.

In addition, by performing the step of wet-pulverizing, non-reacted impurity components in the ferrite magnetic powder particles are eluted into the solvent and removed, and it becomes possible to efficiently pulverize the non-reacted impurity components. As a result, the non-reacted impurity components can be pulverized with good productivity, up to an optimal particle size, in terms of the magnetic characteristic and also in terms of the flowability, when mixed with resin.

However, in these wet cleaning step and wet pulverizing step, alkaline earth metals such as non-reacted Sr and Ba that exist in the sintered powders are eluted into water, being the dispersion solvent, thus increasing pH of this dispersion solvent to 8.5 or greater. Then, a part of the Cr compound contained in the sintered powders is set in a state easily changed to the hexavalent chrome, and it is found that a part of the Cr compound is changed to the hexavalent chrome when sintered in the annealing step thereafter.

Here, in the wet cleaning time and the wet pulverizing time, the inventors of the present invention achieves a structure of suppressing the Cr compound from being changed to the hexavalent chrome by maintaining hydrogen ion concentration of the used dispersion solvent in a range of pH 8.5 or smaller not allowing the Cr compound to elute, and completes the present invention.

Namely, a first means for solving the aforementioned problem provides ferrite magnetic powders, being the ferrite magnetic powders for bond magnet containing iron and alkaline earth metal, which has undergone wet cleaning and/or wet pulverizing process, containing Cr element of 100 ppm or more and 3000 ppm or less, and having no hexavalent chrome detected therein.

A second means provides ferrite magnetic powders, being the ferrite magnetic powders for bond magnet containing iron and alkaline earth metal, which has undergone wet cleaning and/or wet pulverizing, containing Cr element of 100 ppm or more and 3000 ppm or less, with a content of the hexavalent chrome set at 1 ppm or less.

A third means provides the ferrite magnetic powders according to the first or the second means, wherein in the magnetic characteristics of a compact prepared by adding 0.4 cc of polyester resin to 7 g of the ferrite magnetic powders, which is then packed into a mold of $\phi$15 mm, and pressure of 8 MPa is added thereto, residual magnetic flux density Br is 1730 Gauss or greater and intrinsic coercive force iHc is 2270 Oe or greater.

A fourth means provides a manufacturing method of ferrite magnetic powders for manufacturing the ferrite magnetic powders for bond magnet from raw material powders containing iron and alkaline earth metal, including the steps of:
obtaining sintered powders by sintering the raw material powders;
wet-cleaning the sintered powders; and
annealing the wet-cleaned sintered powders,
wherein in the step of wet-cleaning, cleaning is performed, with pH of a dispersion solvent used in cleaning set at 8.5 or less.

A fifth means provides a manufacturing method of ferrite magnetic powders for manufacturing the ferrite magnetic powders for bond magnet from raw material powders containing iron and alkaline earth metal, including the steps of:
obtaining sintered powders by sintering the raw material powders;
pulverizing the sintered powders;
wet-cleaning the pulverized sintered powders; and
annealing the wet-cleaned sintered powders,
wherein in the wet-cleaning step, cleaning is performed, with pH of a dispersion solvent used in cleaning is set at 8.5 or less.

A sixth means provides a manufacturing method of ferrite magnetic powders for manufacturing the ferrite magnetic powders for bond magnet from raw material powders containing iron and alkaline earth metal, including the steps of:
obtaining sintered powders by sintering the raw material powders;
wet-pulverizing the sintered powders; and
annealing the wet-pulverized sintered powders,
wherein in the wet-pulverizing step, wet-pulverization is performed, with pH of a dispersion solvent used in the wet-pulverization set at 8.5 or less.

A seventh means provides the manufacturing method of the ferrite magnetic powders for bond magnet according to any one of the fourth to sixth means, wherein in the step after the step of obtaining the sintered powders and before the step of annealing the sintered powders, a compound having a boiling point of 200° C. or more containing carbon as an indispensable element and one or more kinds of elements selected from H, O, N, Cl, is added to the sintered powders.

An eighth means provides the manufacturing method of the ferrite magnetic powders for bond magnet according to any one of the fourth to sixth means, wherein in the step after the step of obtaining the sintered powders and before the step of annealing the sintered powders, divalent Fe and/or a compound containing the divalent Fe is added to the sintered powders.

A ninth means provides the manufacturing method of the ferrite magnetic powders according to any one of the fourth to sixth means, wherein the wet-pulverized and/or wet-cleaned sintered powders are subjected to reduction treatment in a gas atmosphere in a temperature range of 80° C. to 300° C., containing at least one kind or more of $H_2$ gas, CO gas, NO gas, and HC (hydrocarbon) gas.

A tenth means provides a bond magnet containing the ferrite magnetic powders for the bond magnet according to any one of the first to third means.

Advantages of the Invention

According to the ferrite magnetic powders of the present invention, the flowability of the ferrite magnetic powders when mixed with binder resin and binder rubber can be secured. Further, an amount of the hexavalent chrome in the manufactured bond magnet can be set at a detection limit or less.

BEST MOD FOR CARRYING OUT THE INVENTION

The ferrite magnetic powders according to the present invention contain Cr element of 100 ppm or more and 3000 ppm or less. However, content of the hexavalent chrome is 1 ppm or less, being a detection limit of the diphenylcarbazide spectrophotometric method.

Namely, the ferrite magnetic powders according to the present invention contains the Cr element of 100 ppm or more and 3000 ppm or less, and therefore when mixed with resin, a melt flow rate (MFR) is set high to be 70 g/10 min or more. Then, since this MFR is set high, mixture of the ferrite magnetic powders and resin proceeds smoothly, thus realizing a mixture having high uniformity. The bond magnet manufactured by performing an injection molding of the compact which is manufactured from the mixture having high uniformity in a magnetic field exhibits high magnetic characteristic.

Incidentally, in order to measure the magnetic characteristics of the ferrite magnetic powders according to the present invention, 0.4 cc of polyester resin is added to 7 g of the ferrite magnetic powders, then the mixture is compacted into a die of $\phi 15$ mm, and pressure of 8 MPa is added thereto and the mixture is thereby molded, to produce a compact, and the magnetic characteristics of the ferrite magnetic powders is measured. Then, it is found that this compact has values of 1730 Gauss or more as a residual magnetic flux density Br, and 2270 Oe or more as an intrinsic coercive force iHc.

Then, when the bond magnet is manufactured by performing injection molding in the magnetic field, by using the ferrite magnetic powders showing 1730 Gauss or more of residual magnetic flux density Br, 2270 Oe or more of intrinsic coercive force iHc in the case of being compacted, it is found that the magnetic characteristic such as BHmax of 1.8 MGOe or more close to a sintered isotropic magnet is exhibited by the obtained bond magnet, and therefore this bond magnet can be widely applied to a motor and a magnetic roll, etc.

Meanwhile, although the ferrite magnetic powders according to the present invention contains the Cr element of 100 ppm or less and 3000 ppm or more, the content of the hexavalent chrome, being an environmental load substance, can be set at 1 ppm or less, being the detection limit or less of the diphenylcarbazide spectrophotometric method. The content of this hexavalent chrome is far less amount than the environmental criteria (such as 1000 ppm defined by ROHS reference).

First Embodiment

Next, regarding a manufacturing method of ferrite magnetic powders for bond magnet according to the present invention, a preferable embodiment of this manufacturing process will be explained, with reference to FIG. 1.

Figure 1:
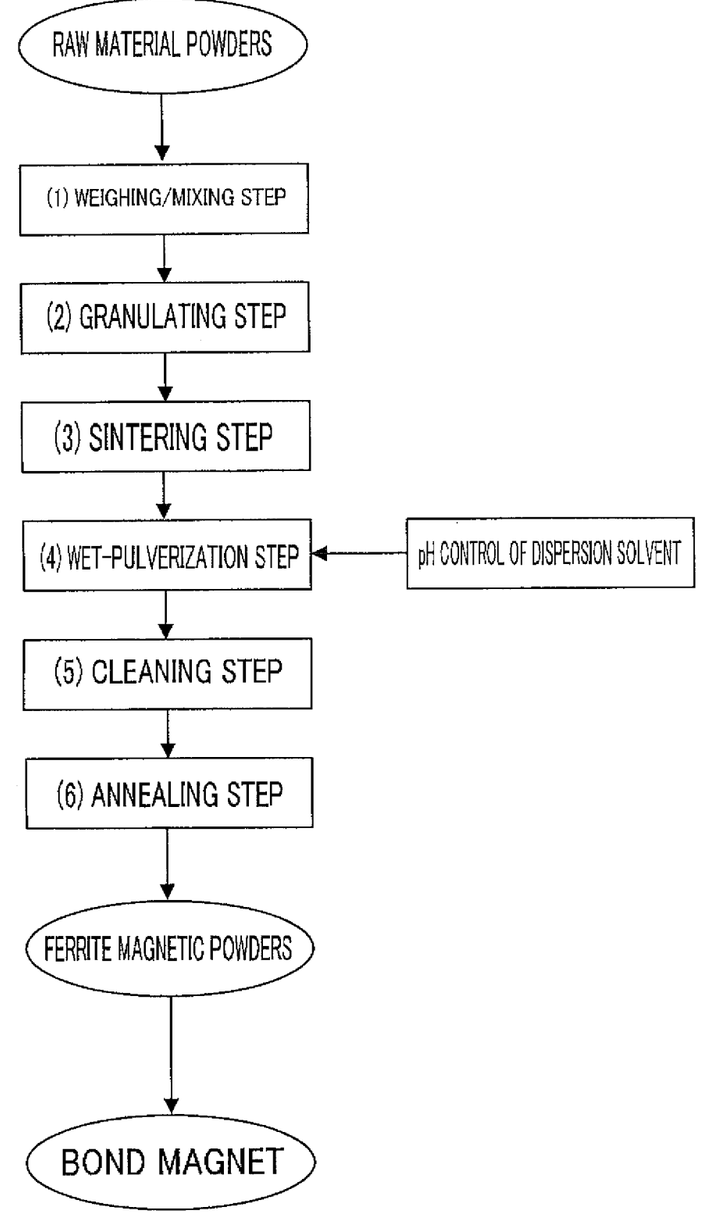
FIG. 1 is a flowchart showing a manufacturing example of ferrite magnetic powders for bond magnet according to the present invention.

As shown in a flow of FIG. 1, the manufacturing step of the ferrite magnetic powders according to the present invention includes the steps such as:
(1) blending and mixing step
(2) granulation step
(3) sintering step
(4) pulverizing step
(5) cleaning step
(6) annealing step.

Each step will be explained hereunder.
(1) Blending/Mixing Step:

Strontium carbonate and iron oxide are weighed and mixed to be fall in a range of $SrCO_3:Fe_2O_3=1:5.20$ to 6.00 at a molar ratio, to obtain a mixture.

At this time, the iron oxide with a purity of 99.0 to 99.9%, and containing 100 ppm or more and 3000 ppm or less of Cr element is used. This is because by setting the content of Cr at 100 ppm or more, an effect of increasing dispersibility of the ferrite magnetic powders is exhibited, and by setting the content of Cr at 3000 ppm or less, deterioration of the magnetic characteristics of the ferrite magnetic powders can be avoided.

(2) Granulation Step:

Water of 5 to 15 wt % is added and mixed into the obtained mixture, and the mixture is granulated in a spherical shape of $\phi 3$ to 10 mm, to obtain granulated powders.

(3) Sintering Step:

The granulated powders obtained in the granulating step are dried and thereafter sintered in a time range from 10 minutes to 2 hours and in a temperature range from 900° C. to 1350° C. in an electric furnace, to obtain sintered powders. Here, when a sintering temperature is set at 900° C. or more, ferrite forming reaction proceeds. Meanwhile, when the sintering temperature is set at 1350° C. or less, coarse growth of crystal grains and sintering among crystals can be avoided in the sintered powders. In addition, when the sintering time is set at 10 minutes or more, the effect of this sintering can be obtained. Meanwhile, from the viewpoint of productivity, the sintering time is preferably set to be 2 hours or less.

(4) Pulverizing Step:

In the pulverizing step, the sintered powders obtained in the sintering step are wet-pulverized, so that its average particle size becomes 2.5 µm or less. This wet-pulverization is performed, by using water as a dispersion solvent. However, at this time, an acid compound is added to the solvent, so as to maintain pH of the dispersion solvent to be 8.5 or less. A so-called pH control is performed, and by a wet-pulverization under this pH control, the ferrite magnetic powders are manufactured.

(5) Cleaning step:

In the cleaning step, water is added to sintered powders of slurry shape obtained in the pulverizing step to dewater the sintered powders, by adding water of ≥0.1 wt. fold, with pH of 5 to 8 with respect to the amount of the sintered powders excluding the solvent. Alternately, after dewatering the sintered powders of slurry shape obtained in the pulverizing step, the sintered powders excluding the solvent is cleaned by using the water of ≥0.1 wt. fold, with pH of 5 to 8 with respect to the amount of the sintered powders, and is dried in a drier of 80 to 150° C.

(6) Annealing Step:

The annealing step is performed for removing crystal distortion generated in the crystal of the ferrite magnetic powders at the time of pulverizing of the sintered powders or at the time of breaking the sintered powders after drying. It is preferable to set the annealing temperature at 850° C. to 1050° C.

This is because by setting the temperature of this annealing step at 850° C. or more, the crystal distortion is removed to make it possible to further enhance iHc. Meanwhile, when this annealing temperature is set at 1050° C. or less, generation of cohesive ferrite magnetic powers can be suppressed, and dispersibility of the ferrite magnetic powders can be maintained. Then, the ferrite magnetic powders according to the present invention can be obtained after this annealing step.

In the aforementioned ferrite magnetic powders, when the content of the hexavalent chrome is measured by a diphenylcarbazide spectrophotometric method, it is confirmed to be a detection limit or less, therefore 1 ppm or less.

Then, the bond magnet is manufactured by a normal method, using the aforementioned ferrite magnetic powders.

It is confirmed that this bond magnet can be used for the purpose of use of each kind of electric/electronic appliance, without trouble.

Second Embodiment

Next, regarding a manufacturing method of the ferrite magnetic powders for carbon according to the present invention, a preferred embodiment with different manufacturing process will be explained.

The manufacturing step of the ferrite magnetic powders according to the present invention includes each step of: (1) blending and mixing step, (2) granulating step, (3) sintering step, (4) pulverizing step, (5) cleaning step, and (6) annealing step.

Each step will be explained hereunder.

(1) Blending/Mixing Step:

Strontium carbonate and iron oxide are weighed and mixed to satisfy a range of $SrCO_3:Fe_2O_3=1:5.20$ to 6.00 at a molar ratio, to obtain the mixture.

At this time, the iron oxide with 99.0 to 99.9% of purity of $Fe_2O_3$, and 100 ppm-3000 ppm of content of Cr element, is used. This is because by setting the content of Cr at 100 ppm or more, effect of enhancing dispersibility of the ferrite magnetic powders is exhibited, and by setting the content of Cr at 3000 ppm or less, deterioration of the magnetic characteristics of the ferrite magnetic powders can be avoided.

(2) Granulating Step:

By adding and mixing the water of 5 to 15 wt % into the obtained mixture, the mixture is granulated into a spherical shape of φ3 to 10 mm, to obtain granulated powders.

(3) Sintering Step:

After drying the granulated powders obtained in the granulating step, the granulated powders are sintered in an electric furnace at a temperature range from 900° to 1350° C., for 10 minutes to 2 hours, to obtain the sintered powders. Here, by setting the sintering temperature at 900° C. or more, a ferrite formation reaction proceeds. Meanwhile, by setting the sintering temperature at 1350° C. or less, coarse growth of crystal grains and sintering among particles can be avoided. By setting the sintering time at 10 minutes or more, the effect of this sintering can be obtained. Meanwhile, from the viewpoint of productivity, the sintering time is preferably set at 2 hours or less.

(4) Pulverizing Step:

In the pulverizing step, the sintered powders obtained in the sintering step are subjected to wet-pulverizing process until its average particle size reaches 2.5 µm or less. By setting the average particle size of the sintered particles at 2.5 µm or less, the magnetic characteristics such as a coercive force is improved in the manufactured bond magnet.

This wet-pulverization is performed by making the water a dispersion solvent, and at this time, an acidic compound is added to the solvent so as to maintain pH of the solvent at 8.5 or less, to perform a so-called pH control. Then, by the pulverization under this pH control, the ferrite magnetic powders are manufactured.

Further preferably, in this pulverizing step, water is used as the dispersion solvent, and particles having average particle size of 100 µm or less such as carbon, or a compound containing carbon as an essential component, and containing one or more kinds of elements selected from H, O, N, Cl having a boiling point of 200° C. or more (abbreviated simply as carbon compound hereunder in some cases), or both of the carbon and the carbon compound are added and mixed into the sintered powders obtained in the sintering step. Then, this mixture is wet-pulverized, to set the average particle size of a ferrite magnetic powder simple body at 2.5 µm or less.

At this time, added amount of carbon and/or carbon compound is set at 0.2 wt % to 2.0 wt % with respect to the sintered powders.

Further, preferably carbon and/or carbon compound is added and mixed in the form of powders having an average particle size of 100 µm or less, or in the form of liquid.

This is because by taking this form, the effect of reducing the hexavalent chrome slightly remained in the ferrite magnetic powders is enhanced. Here, alcohols having a boiling point of 200° C. or more (diethylene glycol, triethyleneglycol, diethanol amine, triethanolamine, dipropyleneglycol, tripropyleneglycol, polyvinyl alcohol (PVA), etc) are given as examples of the compound having the boiling point of 200° C. or more containing carbon as an essential component and containing one or more kinds of elements selected from H, O, N, Cl.

Here, when this carbon compound has a particle form like PVA, etc, this carbon compound may be dissolved into the solvent such as water and alcohol once. In addition, by setting the added amount of this carbon and carbon compound at 0.2 wt % or more of the ferrite magnetic powders, a sufficient reduction effect is exhibited. Further, by setting this added amount at 5 wt % or less with respect to the ferrite magnetic powders, it is possible to avoid a circumstance such as reducing the ferrite magnetic powders to ferrite or generating sintering between ferrite particles. Accordingly, if the added amount of this carbon and carbon compound is set at 0.2 wt % or more and 5 wt % or less with respect to the ferrite magnetic powders, it is possible to obtain the ferrite magnetic powders whereby the bond magnet with high characteristics can be manufactured.

(5) Cleaning Step:

In the cleaning step, by adding water of ≥0.1 wt. fold, with pH of 5 to 8 with respect to the amount of the sintered powders excluding the solvent, to the sintered powders of slurry shape obtained in the pulverizing step, to dewater the sintered powders. Alternately, after dewatering the sintered powders of slurry shape obtained in the pulverizing step, by adding water of ≥0.1 wt. fold, with pH of 5 to 8 with respect to the amount of the sintered powders excluding the solvent, the sintered powders is cleaned and dried in a drier of 80 to 150° C.

Note that it is also possible to perform in this cleaning step adding and mixing operation of particles of an average particle size of 100 µm or less explained in the aforementioned (4) pulverizing step, such as carbon or carbon compound, or both of the carbon and carbon compound.

(6) Annealing Step:

The annealing step is performed to remove the crystal distortion generated in the crystal of the ferrite magnetic powders, at a time of pulverizing the sintered powders or at a time of breaking the sintered powders after drying. Further, when the carbon and/or carbon compound is added in the pulverizing step or the cleaning step in addition to removing this crystal distortion, the slightly remained hexavalent chrome is reduced and removed by a reduction effect of the added carbon and/or carbon compound. The annealing temperature is preferably set at in a range from 850° C. to 1050° C.

By setting the temperature of this annealing step at 850° C. or more, the crystal distortion is removed and iHc can be enhanced in the manufactured bond magnet. Further, when the carbon and/or carbon compound is added in the pulverizing step or the cleaning step in addition to removing this crystal distortion, even in a case where the hexavalent chrome slightly remains, it is reduced and removed. Meanwhile, by setting the annealing temperature at 1050° C. or less, generation of the cohesion of the ferrite magnetic powders is suppressed, and the dispersibility of the ferrite magnetic powders can be maintained. As a result, the ferrite magnetic powders according to the present invention can be obtained after the annealing step.

In addition, it is also preferable that in the (5) cleaning step, bivalent Fe, or a compound containing bivalent Fe (such as FeO, $FeSO_4$, $FeCl_2$), or both of the bivalent Fe and the compound containing the bivalent Fe, are converted to an amount of bivalent Fe, and 0.2 wt % to 2 wt % of which is added to the sintered powders.

Even in a case of adding the bivalent Fe and/or the compound containing the bivalent Fe, the hexavalent chrome is reduced and removed by a reduction force of this bivalent Fe, in the same way as a case of adding the carbon and/or carbon compound, thus making it possible to obtain the ferrite magnetic powders of the present invention.

When the content of the hexavalent chrome in the ferrite magnetic powders is measured by the diphenyl carbazide spectrophotometric method, it is confirmed that the content of the hexavalent chrome is 1 ppm or less, being the detection limit or less of the diphenylcarbazide spectrophotometric method.

Then, the bond magnet is manufactured by a normal method, using the aforementioned ferrite magnetic powders. It is confirmed that this bond magnet can be used for the purpose of use of each kind of electric/electronic appliance, without trouble.

Third Embodiment

Next, further another preferable embodiment of the manufacturing process of the manufacturing method of the ferrite magnetic powders for carbon according to the present invention.

The manufacturing steps of the ferrite magnetic powders according to the present invention includes each kind of step of (1) blending and mixing step, (2) granulating step, (3) sintering step, (4) pulverizing step, (5) cleaning step, and (6) annealing step.

Each step will be explained hereunder.
(1) Blending/Mixing Step:

Strontium carbonate and iron oxide are weighed and mixed to be fall in a range of $SrCO_3:Fe_2O_3=1:5.20$ to 6.00 at a molar ratio, to obtain a mixture.

At this time, the iron oxide with a purity of 99.0 to 99.9%, and containing 100 ppm or more and 3000 ppm or less of Cr element is used. This is because by setting the content of Cr at 100 ppm or more, an effect of increasing dispersibility of the ferrite magnetic powders is exhibited, and by setting the content of Cr at 3000 ppm or less, dispersibility of the ferrite magnetic powders can be enhanced, without deteriorating the magnetic characteristics of the manufacture bond magnet.

(2) Granulating Step:

5 to 15 wt % water is added and mixed into the obtained mixture, which is then granulated into a spherical shape of ϕ3 to 10 mm, to obtain granulated powders.

(3) Sintering Step:

After drying the granulated powders obtained in the granulating step, the granulated powders are sintered in the electric furnace at a temperature in a range from 900° C. to 1350° C. for 10 minutes-2 hours, to obtain the sintered powders. Here, by setting the sintering temperature at 900° C. or more, the ferrite forming reaction proceeds. Meanwhile, when the sintering temperature is set at 1350° C. or less, coarse growth of crystal grains and sintering among crystals can be avoided in the sintered powders. In addition, when the sintering time is set at 10 minutes or more, the effect of this sintering can be obtained. Meanwhile, from the viewpoint of productivity, the sintering time is preferably set to be 2 hours or less.

(4) Pulverizing Step:

In the pulverizing step, water is added to the sintered powders obtained in the sintering step as the dispersion solvent, and the sintered powders obtained in the sintering step are wet-pulverized, so that its average particle size becomes 2.5 μm or less. By performing this wet-pulverizing, the ferrite powders of high characteristics can be manufactured, in a state of fine particles, with good productivity.

Note that it is possible to perform in this pulverizing step the operation of adding and mixing the carbon of average particle size of 100 μm or less, and/or the carbon compound explained in the pulverizing step (first embodiment (4)).

(5) Cleaning Step:

In the cleaning step, water is added to sintered powders of slurry shape obtained in the pulverizing step to dewater the sintered powders, by adding water of ≥0.1 wt. fold, with pH of 5 to 8 with respect to the amount of the sintered powders excluding the solvent. Alternately, after dewatering the sintered powders of slurry shape obtained in the pulverizing step, the sintered powders excluding the solvent is cleaned by using the water of ≥0.1 wt. fold, with pH of 5 to 8 with respect to the amount of the sintered powders, and is dried in a drier of 80 to 150° C.

Note that the operation of adding and mixing the carbon of average particle size of 100 μm or less and/or carbon compound explained in the pulverizing step of the (first embodiment (4)) may be performed in this cleaning step.

(6) Annealing Step:

The annealing step is performed for removing crystal distortion generated in the crystal of the ferrite magnetic powders at the time of pulverizing of the sintered powders or at the time of breaking the sintered powders after drying. Further, when the carbon and/or carbon compound is added in the pulverizing step or the cleaning step in addition to removing the crystal distortion, even in a case where the hexavalent chrome slightly remains, it is reduced and removed.

Preferably, the annealing temperature is set in a range from 850° C. to 1050° C.

This is because by setting the temperature of the annealing step at 850° C. or more, the aforementioned crystal distortion is removed and iHc can be enhanced in the manufactured bond magnet. Meanwhile, this is because if the annealing temperature is set at 1050° C. or less, the generation of the cohesion of the ferrite magnetic powders can be suppressed and the dispersibility of the ferrite magnetic powders can be maintained.

Next, the ferrite magnetic powders after the annealing step are placed in a constant temperature bath that can be air-tightly closed, equipped with a stirring function, and inside of this bath is replaced with reductive gas containing one or more kinds of gases selected from $H_2$ gas, CO gas, NO gas, HC (hydrocarbon) gas, to set the temperature inside of the bath in a range from 80° C. to 300° C. Whereby, the hexavalent chrome is subjected to reduction process.

Here, concentration of the reductive gas is preferably set at 0.01% or more. By setting the concentration of the reductive gas at 0.01% or more, effect of reducing and removing the remained hexavalent chrome is increased, thereby making it possible to reduce the time required for the reduction process to 12 hours or less.

Further, if the processing temperature is set at 80° C. or more, the effect of reducing the hexavalent chrome is exhibited, and if the processing temperature is set at 300° C. or less, the ferrite is reduced, thereby making it possible to avoid the deterioration of the magnetic characteristics of the ferrite in the manufactured bond magnet.

Then, the ferrite magnetic powders according to the present invention are obtained after this annealing step.

In addition, it is also preferable that in the (4) pulverizing step, (5) cleaning step, instead of the carbon and/or carbon compound, bivalent Fe, or a compound containing bivalent Fe (such as $FeO$, $FeSO_4$, $FeCl_2$), or both of the bivalent Fe and the compound containing the bivalent Fe, are converted to an amount of bivalent Fe, and 0.2 wt % to 2 wt % of which is added to the sintered powders.

Even in a case of adding the bivalent Fe and/or the compound containing the bivalent Fe, the hexavalent chrome is reduced and removed by a reduction force of this bivalent Fe, in the same way as a case of adding the carbon and/or carbon compound, thus making it possible to obtain the ferrite magnetic powders of the present invention.

When the content of the hexavalent chrome in the ferrite magnetic powders is measured by the diphenylcarbazide spectrophotometric method, it is confirmed that the content of the hexavalent chrome is 1 ppm or less, being the detection limit or less of the diphenylcarbazide spectrophotometric method.

Then, when flowability is obtained based on a measurement method of a melt flow rate (MFR) as will be described later, it is found that the ferrite magnetic powders according to the present invention have excellent flowability and can be easily and uniformly mixed with resin and rubber. By compressively molding this mixture, the bond magnet according to the present invention can be manufactured. Also, it is confirmed that this bond magnet can be used for the purpose of use of each kind of electric/electronic product, without trouble.

Characteristics as a green compact of a ferrite magnetic powder according to the present invention are as follows: the value of residual magnetic flux density Br is 1730 Gauss or more, and the value of intrinsic coercive force iHc is 2270 Oe, and further as the magnetic characteristic of the bond magnet at the time of conducting a magnetic field orientation, BHmax shows 1.8 MGOe or more, and therefore the ferrite magnetic powders of the present invention corresponds to a sintered isotropic magnet.

EXAMPLES

The present invention will be more specifically explained hereunder, with reference to the drawings.

However, the present invention is not limited to the scope of these examples.

Example 1

Strontium carbonate and iron oxide were weighed and mixed to be fall in a range of $SrCO_3:Fe_2O_3=1:5.75$ at a molar ratio. Then, this weighed substance was mixed by a sample mill, to obtain a mixed powder. Next, by adding 10 wt % of water to this mixed powder, which was then kneaded, to granulate this kneaded substance, which was then dried as a granulated powder having an average particle size of 8 mm. This dried granulated powder was set in the electric furnace, and sintered at 1200° C. in an atmospheric air for 2 hours, to obtain a sintered substance. This sintered substance was coarsely pulverized by the sample mill, to obtain a sintered powder having an average particle size of 8.5 μm.

Next, this sintered powder was wet-pulverized for 120 minutes by using an attriter with a volume of 10 L. First, 1.3 kg of the sintered powders, 15 g of hydrochloric acid with concentration of 35%, and 10 kg of steel ball of ϕ8 mm were weighed. Next, while operating the attriter at a rotation speed of 200 rpm, 10 kg of the steel ball, 2 L of water with pH6.7, 15 g of the hydrochloric acid, and 1.3 kg of the sintered powders were charged into this attriter in this order, to obtain slurry. At this time, the slurry was batched off and left at rest. Then, pH of a supernatant solution was measured, to obtain pH of 1.25. Meanwhile, the attriter was continued to operate for 120 minutes, to perform wet-pulverization. Then, the slurry was batched and left at rest again, and pH of the supernatant solution was measured. Then it is found that pH after elapse of 60 minutes shows 5.29, and pH after elapse of 120 minutes shows 7.7, and this reveals that pH gradually rises, along with elapse of wet-pulverizing time. However, pH of the slurry during this wet-pulverization is maintained to 8.5 or less.

When the wet-pulverization was completed, the slurry obtained by using filter paper and infundibulum was dewatered, and thereafter was decanted and cleaned by water of 4 L with pH 6.5. The sintered powders obtained by cleaning and filtering were dried in the drier of 120° C., to obtain strontium ferrite powder having average particle size of 1.47 μm.

Next, this strontium ferrite powder was set in the electric furnace, which was then annealed for 20 minutes at 980° C. under the atmospheric air, and the ferrite magnetic powder for bond magnet according to example 1 was manufactured.

When powder characteristics of the manufactured ferrite magnetic powder for bond magnet according to the example 1 were measured, a specific surface area diameter measured by an air-permeation method was 1.65 μm and compaction density was 3.29 g/cm$^3$. Note that a mode of a measurement method such as the specific surface area diameter, etc, will be described later.

In addition, the melt flow rate (MFR) is 71.5 g/10 min, showing high flowability.

Next, by using the ferrite magnetic powder for bond magnet according to the example 1, a green compact according to the example 1 was manufactured.

When the magnetic characteristics of the green compact according to the example 1 was measured, Br was 1870 Gauss (described as simply G hereafter in some cases), and iHc was 2570 Oe, showing high values.

Next, when measurement of the magnetic characteristics of the ferrite magnetic powder for bond magnet according to the example 1 was performed by "5. measurement of the magnetic characteristics of an injection molded body", Br was 2751 G, iHc was 2444 Oe, BHmax was 1.84 MGOe, and SQx was 0.972.

As described above, it is found that the flowability of the ferrite magnetic powder for bond magnet according to the example 1 is excellent, and therefore SQx value, being one of indicators of orientation in an injection molded body according to the example 1, is also high, and further this ferrite magnetic powder for bond magnet has a high magnetic characteristic.

In addition, when the amount of the hexavalent chrome of the ferrite magnetic powders for bond magnet according to the example 1 was measured by the diphenylcarbazide spectrophotometric method (a method of extraction was executed by 3% solute method of a low quality method.), it was found that the value was 1 ppm or less, being the detection limit or less.

As described above, powder characteristics, flowing characteristics, and magnetic characteristics were measured for the ferrite magnetic powders for bond magnet and the injection molded body according to the example 1, and measured values of the magnetic characteristics were described in table 1.

Here, a specific mode will be explained, for the measurement method of the specific surface area, etc, of the ferrite magnetic powders for bond magnet according to the example 1.

1. Measurement of the Specific Surface Area Diameter by Air-Permeation Method

A powder specific surface area measuring apparatus SS-100 by SHIMADZU CORP. was used as a measuring apparatus.

By using a press machine attached to this powder specific surface area measuring apparatus, a sample of the ferrite magnetic powders for bond magnet was press-molded to be formed in a sectional area of 2 cm² and thickness of 1 cm. Meanwhile, a small amount of Vaseline was applied on a sample tube of this powder specific surface area measuring apparatus, and the press-molded ferrite powder sample for bond magnet was set in this sample tube.

Then, time t was measured, at which 2 cm³ of air is transmitted through this press-molded ferrite powder sample for bond magnet, and from this measured time t, the specific surface area of the ferrite powder sample for bond magnet was calculated by using the following conversion formula.

$$Sw = (14/\rho) \cdot ((\Delta P \cdot A \cdot t \cdot \epsilon^3)/(\eta \cdot L \cdot Q \cdot (1-\epsilon)^2))^{0.5}$$

However, Sw indicates the specific surface area. $\rho$ indicates the density of the press-molded ferrite powder sample for bond magnet, and in this example, this value is 5.1 g/cm³. $\Delta P$ indicates a pressure difference, and in this example, this value is 40 g/cm². A indicates a sectional area of a sample layer, and in this example, this value is 2 cm². $\eta$ indicates a viscosity coefficient, and in this example, this value is 180×10−6 g/cm². L indicates the thickness of a sample, and in this example, this value is 1 cm. W indicates a weight of the sample, and in this example, this value is 5 g. Q indicates a transmission amount of air, and in this example, this value is 2 cm³. t indicates a required time for transmission. $\epsilon$ indicates a void content $(1-W/(\rho \cdot A \cdot L))$ of the sample layer.

Next, on the basis that the particle of the ferrite powder sample for bond magnet is formed in a cube and the particles are uniform, the specific surface area was calculated from the specific surface area diameter: $Da = 6/(\rho \cdot Sw)$.

2. Measurement of Pressed Density

The value of the pressed density was obtained by measuring a density value after pressurizing and molding the ferrite powder sample for bond magnet with a pressure of 1 ton/cm².

3. Measurement of Melt Flow Rate (MFR)

(1) 3-lots of the ferrite magnetic powders for bond magnet were manufactured, and 3000 g of ferrite magnetic powders for bond magnet was picked from each lot.

Meanwhile, 30 g of silane-coupling agent (by Nippon Unicar Company Limited, Product name A-1122), 15 g of water, and 30 g of methanol were prepared. They were filled in a high speed mixer (by FUKAE KOUGYOU KK, FS-GC-5JI), and were mixed for 5 minutes of processing time at 8 m/sec of peripheral speed, to obtain a mixture.

(2) The obtained mixture wad dried for 100° C.×90 minutes to obtain dried powders.

(3) The obtained 3030 g of dried powders and 400 g of 6-nilon (by UBE Industries, LTD, P-1010) were filled in the high speed mixer (by FUKAE KOUGYOU KK, FS-GC-5JI), and mixed for 5 minutes of processing time at 8 m/sec of peripheral speed, to obtain a mixture.

(4) The obtained mixture was kneaded, to obtain a pellet having 2 mm of average diameter. Note that in this kneading, a continuous kneading exclusion type device (KCK70-22VEX (6)) by KCK LTD, was used.

(5) 10 kg of load was applied on the obtained pellet at 270° C., and the weight of the kneaded product excluded from a flowability evaluation device within 10 minutes was measured, and this value was set as a melt flow rate (MFR). Note that the flowability evaluation device, C-5059D2, by TOYO SEIKI KK was used in measurement. This device was constituted based on JIS-K7210.

4. Measurement of the Magnetic Characteristic of the Green Compact

First, the green compact was manufactured from the ferrite magnetic powders for bond magnet.

7 g of the ferrite magnetic powders for bond magnet was weighed, and 0.4 cc of polyester resin was added and mixed therein.

The weighed ferrite magnetic powders for bond magnet were filled in a metallic mold formed in a columnar shape of ϕ15 mm, then pressurized by pressure 8 MPa for 20 seconds to obtain the green compact.

The obtained green compact was pulled out of the metallic mold, then put in the drier, and dried for 30 seconds at 150° C. Then, after the temperature was cooled down to 25° C., being the room temperature, Br and iHc of this columnar green compact were measured by a BH tracer (by TOEI KOGYO KK, BH tracer).

5. Measurement of the Magnetic Characteristics of the Injection Molded Body

The magnetic characteristics of the injection molded body were measured as follows.

(1) In the same way as (1) to (4) explained in the aforementioned "3. Measurement of melt flow rate (MFR)", the pellet with average diameter of approximately 2 mm was obtained.

(2) The obtained pellet was injection-molded by 8.5N/mm² molding pressure at temperature of 290° C., in a magnetic field of 10 KOe, by using an injection molding machine, to obtain a columnar molded product with diameter 15 mm×height 8 mm.

Note that in this columnar molded product, a direction of the orientation of the magnetic field was set as a direction along a central axis of a column.

(3) Br, iHc, BHmax, SQx(Br/4πI) of the obtained columnar molded product was measured by the BH tracer (by TOEI KOGYO KK, BH tracer).

Example 2

By performing the same operation using the same raw material as that of the example 1, the sintered powders were manufactured. The manufactured sintered powders were subjected to wet pulverizing step as described below, and strontium ferrite powders according to example 2 were manufactured.

First, 1.3 kg of sintered powders and 10 kg of steel ball of ϕ8 mm were weighed. Next, while operating the attriter at a rotation speed of 200 rpm, 10 kg of the steel ball and 2 L of water with pH6.7 were charged into this attriter. Further, a steel pipe with diameter of φ6 mm was inserted to this aqueous solution, and carbon dioxide gas was blown thereinto for 20 minutes at a speed of 1 mL/min. When this aqueous solution was left at rest and pH measurement was performed, the value was pH4.80. Next, 1.3 kg of the sintered powders were charged into this aqueous solution while operating the attriter at a rotation speed of 200 rpm, and the slurry was obtained. This slurry was batched off and left at rest. Then, pH of a supernatant solution was measured, to obtain pH of 6.64.

Next, the wet-type pulverization was performed by rotating the attriter for 120 minutes, while the carbon dioxide gas was continued to be blown in. The slurry was batched and left at rest again, after 60 minutes in the middle of this wet-type pulverization and after 120 minutes from the end of the wet-pulverization, and when pH of the supernatant solution was measured, pH after 60 minutes was 5.80, and pH after 120 minutes was 5.7, and pH of the slurry during performing the wet-type pulverization was maintained to be lower than 8.5.

When the wet-type pulverization was completed, in the same way as the example 1, after dewatering the slurry, decantation was performed to dry the sintered powders obtained by cleaning and filtering, and strontium ferrite powders with average particle size of 1.42 μm was obtained.

Next, this strontium ferrite powders were set in the electric furnace, and subjected to annealing for 20 minutes at 980° C. in the atmospheric air, to manufacture the ferrite magnetic powders for bond magnet according to example 2.

When the powder characteristics of the ferrite magnetic powders for bond magnet according to the example 2 were measured in the same way as the example 1, the specific surface area diameter measured by the air-permeation method was 1.71 μm and the pressed density was 3.31 g/cm$^3$.

Also, the melt flow rate (MFR) was 72.8 g/10 min, being high flowability.

In the same way as the example 1, the green compact was manufactured from the ferrite magnetic powders for bond magnet according to the example 2. Then, when the magnetic characteristics of this green compact were measured, Br was 1870 Gauss (called G hereafter), and iHc was 2560 Oe, being high values.

Further, in the same way as the example 1, a kneaded product according to the example 2 was manufactured form the ferrite magnetic powders for bond magnet according to the example 2.

When measuring the magnetic characteristics of the injection molded body obtained by injection-molding the kneaded product according to the example 1 in the magnetic field, Br was 2757 G, iHc was 2440 Oe, BHmax was 1.85 MGOe, and SQx was 0.971.

As described above, it is found that the flowability of the ferrite magnetic powder for bond magnet according to the example 2 is excellent, and therefore SQx value, being one of indicators of orientation in an injection molded body according to the example 2, is also high, and further this ferrite magnetic powder for bond magnet has a high magnetic characteristic.

In addition, in the same way as the example 1, when measuring the amount of the hexavalent chrome of the ferrite magnetic powders for bond magnet according to the example 2, it was found that the value was 1 ppm or less, being the detection limit or less.

As described above, powder characteristics, flowing characteristics, and magnetic characteristics were measured for the ferrite magnetic powders for bond magnet and the injection molded body according to the example 2, and measured values of the magnetic characteristics were described in table 1.

Example 3

The sintered powders were manufactured by performing the same operation as that of the example 1 using the same raw materials.

Strontium ferrite powders were manufactured by performing the same operation for the manufactured sintered powders in the wet-type pulverizing step as the operation of the example 1, excluding the point that hydrochloric acid and carbon corresponding to 0.5 wt % of the sintered powders were added.

Specifically, 1.3 kg of the sintered powders, 12 g of the hydrochloric acid with concentration of 35%, and 0.65 of carbon with average particle size of 3 μm, and 10 kg of steel ball of φ8 mm were weighed. Next, while operating the attriter at a rotation speed of 200 rpm, 10 kg of the steel ball, 2 L of water with pH6.7, 15 g of the hydrochloric acid, and 1.3 kg of the sintered powders were charged into this attriter in this order, to obtain slurry.

At this time, the slurry was batched off and left at rest. Then, pH of a supernatant solution was measured, to obtain pH of 1.32. Meanwhile, the attriter was continued to operate for 120 minutes, to perform wet-pulverization. Then, the slurry was batched and left at rest again, and pH of the supernatant solution was measured. Then it is found that pH after elapse of 60 minutes shows 5.81, and pH after elapse of 120 minutes shows 8.2, and this reveals that pH gradually rises, along with elapse of wet-pulverizing time. However, pH of the slurry during this wet-pulverization is maintained to 8.5 or less.

When the wet-pulverization was completed, in the same way as the example 1, after dewatering and filtering the slurry, decantation was performed, thereby drying the sintered powders obtained by cleaning and filtering, and the strontium ferrite powders with average particle size of 1.50 μm was obtained.

Next, the strontium ferrite powders were set in the electric furnace, then subjected to annealing for 20 minutes at 980° C. in the atmospheric air, and the ferrite magnetic powders for bond magnet according to embodiment 3 was manufactured.

When measuring the powder characteristics of the ferrite magnetic powders for bond magnet according to the example 3 in the same way as the example 1, the specific surface area diameter measured by the air-permeation method was 1.95 μm and the pressed density was 3.43 g/cm$^3$.

Also, the melt flow rate (MFR) was 77.8 g/10 min, being high flowability.

In the same way as the example 1, the green compact was manufactured from the ferrite magnetic powders for bond magnet according to the example 3. Then, when the magnetic characteristics of this green compact were measured, Br was 1880 G, and iHc was 2570 Oe, being high values.

Further, in the same way as the example 1, the kneaded product according to the example 3 was manufactured from the ferrite magnetic powders for bond magnet according to the example 3.

When measuring the magnetic characteristics of the injection molded body obtained by injection-molding the kneaded product according to the example 3 in the magnetic field, Br was 2780 G, iHc was 2400 Oe, BHmax was 1.84 MGOe, and SQx was 0.980.

As described above, it was found that the flowability of the ferrite magnetic powder for bond magnet according to the example 3 was excellent, and therefore SQx value, being one of indicators of orientation in an injection molded body according to the example 3, was also high, and further this ferrite magnetic powder for bond magnet had a high magnetic characteristic.

In addition, when the amount of the hexavalent chrome of the ferrite magnetic powders for bond magnet according to the example 3 was measured in the same way as the example 1, it was found that the value was 1 ppm or less, being the detection limit or less.

As described above, powder characteristics, flowing characteristics, and magnetic characteristics were measured for the ferrite magnetic powders for bond magnet and the injection molded body according to the example 3, and measured values of the magnetic characteristics were described in table 1.

Example 4

The sintered powders were manufactured by performing the same operation using the same raw materials as those of the example 1.

The strontium ferrite powders were manufactured by operating the manufactured sintered powders in the same way as the example 1 excluding the point that hydrochloric acid was not added in the wet-type pulverizing step.

Specifically, 1.3 kg of the sintered powders, 12 g of the hydrochloric acid with concentration of 35%, and 10 kg of steel ball of $\phi 8$ mm were weighed. Next, while operating the attriter at a rotation speed of 200 rpm, 10 kg of the steel ball, 2 L of water with pH6.7, 15 g of the hydrochloric acid, and 1.3 kg of the sintered powders were charged into this attriter in this order, to obtain slurry. At this time, the slurry was batched off and left at rest. Then, pH of a supernatant solution was measured, to obtain pH of 1.38. Meanwhile, the attriter was continued to operate for 120 minutes, to perform wet-pulverization. Then, the slurry was batched and left at rest again, and pH of the supernatant solution was measured. Then it is found that pH after elapse of 60 minutes shows 5.90, and pH after elapse of 120 minutes shows 8.4 and this reveals that pH gradually rises, along with elapse of wet-pulverizing time. However, pH of the slurry during this wet-pulverization is maintained to 8.5 or less.

When the wet-pulverization was completed, in the same way as the example 1, after dewatering and filtering the slurry, decantation was performed, thereby drying the sintered powders obtained by cleaning and filtering, and the strontium ferrite powders with average particle size diameter of 1.50 µm was obtained.

Next, this strontium ferrite powders were set in the electric furnace, and subjected to annealing for 20 minutes at 980° C. in the atmospheric air.

Then, the annealed strontium ferrite particles were set in the air-tightly closed constant temperature bath having a stirring function, and the mixed gas (set hydrogen gas concentration at 0.1%) of nitrogen and hydrogen was flown in this constant temperature bath at a flow rate of 1 L/min, to replace the atmosphere in this constant temperature bath with the mixed gas. Then, after this replacement was completed, an atmosphere temperature in this constant temperature bath was increased up to 150° C. while stirring the annealed strontium ferrite powders and this state was maintained for 2 hours, and thereafter the temperature was decreased down to the room temperature. Thus, the ferrite magnetic powders for bond magnet according to example 4 were manufactured.

When measuring the particle characteristics of the ferrite magnetic powders for bond magnet according to the example 4 in the same way as the example 1, the specific surface area measured by the air-permeation method was 1.90 µm, and the pressed density was 3.41 g/cm$^3$.

Also, the melt flow rate (MFR) was 75, 5 g/10 min, being high flowability.

In the same way as the example 1, the green compact was manufactured from the ferrite magnetic powders for bond magnet according to the example 4. Then, when the magnetic characteristics of the green compact were measured, Br was 1880 G, and iHc was 2550 Oe, being high values.

Further, in the same way as the example 1, the kneaded product according to example 4 was manufactured from the ferrite magnetic powers for bond magnet according to the example 4.

When measuring the magnetic characteristics of the injection molded body obtained by injection-molding the kneaded product according to the example 4 in the magnetic field, Br was 2760 G, iHc was 2433 Oe, BHmax was 1.86 MGOe, and SQx was 0.978.

As described above, it was found that the flowability of the ferrite magnetic powder for bond magnet according to the example 2 is excellent, and therefore SQx value, being one of indicators of orientation in an injection molded body according to the example 4, is also high, and further this ferrite magnetic powder for bond magnet has a high magnetic characteristic.

In addition, in the same way as the example 1, when measuring the amount of the hexavalent chrome of the ferrite magnetic powders for bond magnet according to the example 4, it was found that the value was 1 ppm or less, being the detection limit or less.

As described above, powder characteristics, flowing characteristics, and magnetic characteristics were measured for the ferrite magnetic powders for bond magnet and the injection molded body according to the example 4, and measured values of the magnetic characteristics were described in table 1.

Comparative Example 1

The sintered powders were manufactured by performing the same operation using the same raw materials as those of the example 1.

In the same way as the example 1, the strontium ferrite powders were manufactured from the manufactured sintered powders, excluding the point that the hydrochloric acid was not added in the wet-type pulverizing step.

Specifically, 1.3 kg of the sintered powders, and 10 kg of steel ball of $\phi 8$ mm were weighed. Next, while operating the attriter having a volume of 10 L at a rotation speed of 200 rpm, 10 kg of the steel ball, 2 L of water with pH6.7, and 1.3 kg of the sintered powders were charged into this attriter in this order, to obtain slurry. At this time, the slurry was batched off and left at rest. Then, pH of a supernatant solution was measured, to obtain pH of 9.95. Meanwhile, the attriter was continued to operate for 120 minutes, to perform wet-pulverization. Then, the slurry was batched off and left at rest again, and pH of the supernatant solution was measured. Then it is found that pH after elapse of 60 minutes shows 11.1, and pH after elapse of 120 minutes shows 11.9 and this reveals that pH gradually rises, along with elapse of wet-pulverizing time. Then, the value of the pH of the slurry during this wet-pulverization becomes higher than pH 8.5 at which Cr is considered to be changed to the hexavalent chrome.

When the wet-type pulverization was completed, in the same way as the example 1, after dewatering and filtering the slurry, decantation was performed, thereby drying the sintered powders obtained by cleaning and filtering, and the strontium ferrite powders with average particle size diameter of 1.50 μm were obtained.

Next, this strontium ferrite powders were set in the electric furnace, and subjected to annealing for 20 minutes at 980° C., in the atmospheric air, and the ferrite magnetic powders for bond magnet according to comparative example 1 were manufactured.

When measuring the powder characteristics of the ferrite magnetic powders for bond magnet according to the comparative example 1 in the same way as the example 1, the specific surface area measured by the air-permeation method was 1.80 μm, and the pressed density was 3.39 g/cm$^3$.

Also, the melt flow rate (MFR) was 72.3 g/10 min, being high flowability.

The green compact was manufactured from the ferrite magnetic powders for bond magnet according to the comparative example 1, in the same way as the example 1. Then, when the magnetic characteristics of this green compact were measured, Br was 1870 G, and iHc was 2560 Oe, being high values.

Further, the kneaded product according to the comparative example 1 was manufactured from the ferrite magnetic powders for bond magnet according to the comparative example 1 in the same way as the example 1.

When measuring the magnetic characteristics of the injection molded body obtained by injection-molding the kneaded product according to the comparative example 1 in the magnetic field, Br was 2753 G, iHc was 2442 Oe, BHmax was 1.84 MGOe, and SQx was 0.972.

As described above, it is found that the flowability of the ferrite magnetic powder for bond magnet according to the comparative example 1 is excellent, and therefore SQx value, being one of indicators of orientation in an injection molded body according to the example 2, is also high, and further this ferrite magnetic powder for bond magnet has a high magnetic characteristic.

However, when the amount of the hexavalent chrome of the ferrite magnetic powders for bond magnet according to the comparative example 1 was measured in the same way as the example 1, it was found that the value was 49 ppm.

As described above, powder characteristics, flowing characteristics, and magnetic characteristics were measured for the ferrite magnetic powders for bond magnet and the injection molded body according to the comparative example 1, and measured values of the magnetic characteristics were described in table 1.

Comparative Example 2

The sintered powders were manufactured by performing the same operation as that of the example 1, excluding the point that the iron oxide containing 5 ppm of Cr element was used as the raw material.

The strontium ferrite powders were manufactured from the manufactured sintered powders, in the same way as the example 1, excluding the point that the hydrochloric acid was not added in the wet-type pulverizing step.

Specifically, 1.3 kg of the sintered powders, and 10 kg of steel ball of ϕ8 mm were weighed. Next, while operating the attriter having a volume of 10 L at a rotation speed of 200 rpm, 10 kg of the steel ball, 2 L of water with pH6.7, and 1.3 kg of the sintered powders were charged into this attriter in this order, to obtain slurry. At this time, the slurry was batched off and left at rest. Then, pH of a supernatant solution was measured, to obtain pH of 9.95. Meanwhile, the attriter was continued to operate for 120 minutes, to perform wet-pulverization. Then, the slurry was batched off and left at rest again, and pH of the supernatant solution was measured. Then it is found that pH after elapse of 60 minutes shows 11.1, and pH after elapse of 120 minutes shows 11.9 and this reveals that pH gradually rises, along with elapse of wet-pulverizing time. Then, the value of the pH of the slurry during this wet-pulverization becomes higher than pH 8.5 at which Cr is considered to be changed to the hexavalent chrome.

When the wet-type pulverization was completed, in the same way as the example 1, after dewatering and filtering the slurry, decantation was performed, thereby drying the sintered powders obtained by cleaning and filtering, and the strontium ferrite powders with average particle size diameter of 1.45 μm were obtained.

Next, this strontium ferrite powders were set in the electric furnace, and subjected to annealing for 20 minutes at 980° C., in the atmospheric air, and the ferrite magnetic powders for bond magnet according to comparative example 2 were manufactured.

When measuring the powder characteristics of the ferrite magnetic powders for bond magnet according to the comparative example 2 in the same way as the example 1, the specific surface area measured by the air-permeation method was 1.74 μm, and the pressed density was 3.37 g/cm$^3$.

Also, the melt flow rate (MFR) was 58.9 g/10 min, being low flowability.

The green compact was manufactured from the ferrite magnetic powders for bond magnet according to the comparative example 2, in the same way as the example 1. Then, when the magnetic characteristics of this green compact were measured, Br was 1850 G, and iHc was 2300 Oe.

Further, in the same way as the example 1, the kneaded product according to the comparative example 2 was manufactured from the ferrite magnetic powders for bond magnet according to the comparative example 2.

When measuring the magnetic characteristics of the injection molded body obtained by injection-molding the kneaded product according to the comparative example 2 in the magnetic field, Br was 2725 G, iHc was 2463 Oe, BHmax was 1.77 MGOe, and SQx was 0.964.

As described above, it was found that the flowability of the ferrite magnetic powders for bond magnet according to the comparative example 2 was deteriorated, thus lowering the SQx value, being one of the indicators in the orientation of the injection molded body according to the comparative example 2, and the magnetic characteristics were deteriorated.

Further, when the amount of the hexavalent chrome of the ferrite magnetic powders for bond magnet according to the comparative example 2 was measured in the same way as the example 1, it was found that the value was 1 ppm or less, being the detection limit or less.

As described above, powder characteristics, flowing characteristics, and magnetic characteristics were measured for the ferrite magnetic powders for bond magnet and the injection molded body according to the comparative example 2, and measured values of the magnetic characteristics were described in table 1.

TABLE 1

| | Ferrite powders for bond magnet | | | | Green compact | | Injection molded body | | | SQx |
|---|---|---|---|---|---|---|---|---|---|---|
| | Specific surface area diameter (μm) | Pressed density (g/cm³) | MFR (g/10 min) | Hexavalent chrome (ppm) | Br (G) | iHc (Oe) | Br (G) | iHc (Oe) | BHmax (MGOe) | Br/4π Is |
| Example 1 | 1.65 | 3.29 | 71.5 | 1≤ | 1870 | 2570 | 2751 | 2444 | 1.84 | 0.972 |
| Example 2 | 1.71 | 3.31 | 72.8 | 1≤ | 1870 | 2560 | 2757 | 2440 | 1.85 | 0.971 |
| Example 3 | 1.95 | 3.43 | 77.8 | 1≤ | 1880 | 2570 | 2780 | 2400 | 1.84 | 0.980 |
| Example 4 | 1.90 | 3.41 | 75.5 | 1≤ | 1880 | 2550 | 2760 | 2433 | 1.86 | 0.978 |
| Comparative Example 1 | 1.80 | 3.39 | 72.3 | 49 | 1870 | 2560 | 2753 | 2442 | 1.84 | 0.972 |
| Comparative Example 2 | 1.74 | 3.37 | 58.9 | 1≤ | 1850 | 2300 | 2725 | 2463 | 1.77 | 0.964 |

The invention claimed is:

1. A method of manufacturing ferrite magnetic powders, comprising steps of:
   obtaining sintered powders by sintering raw material powders comprising iron, chromium, and an alkaline earth metal;
   wet-pulverizing the sintered powders;
   wet-cleaning the wet-pulverized powders;
   annealing the wet-cleaned powders; and
   reducing the annealed powders at a temperature range from 80° C. to 300° C. in a gas atmosphere containing at least one gas selected from the group consisting of $H_2$ gas, CO gas, NO gas, and HC (hydrocarbon) gas,
   wherein the pH of a dispersion solvent used in the step of wet-pulverizing is maintained at 8.5 or less by adding an acid compound.

2. The method of manufacturing ferrite magnetic powders according to claim 1, wherein, in the step of wet-cleaning, the wet-pulverized powders are wet-cleaned with water having a pH of between 5 and 8.

3. The method of manufacturing ferrite magnetic powders according to claim 1, wherein carbon or a compound having a boiling point of 200° C. or more and comprising carbon and at least one element selected from the group consisting of H, O, N, and Cl, is added to the sintered powders after the step of obtaining the sintered powders and before the step of annealing.

4. The method of manufacturing ferrite magnetic powders according to claim 1, wherein a compound containing bivalent Fe is added to the sintered powders, after the step of obtaining the sintered powders and before the step of annealing.

5. The method of manufacturing ferrite magnetic powders according to claim 1, wherein the raw material powders contain 100 ppm or more and 3,000 ppm or less of chromium.

6. The method of manufacturing ferrite magnetic powders according to claim 1, wherein the acid compound added in the step of wet-pulverizing is hydrochloric acid or carbon dioxide gas.

7. The method of manufacturing ferrite magnetic powders according to claim 2, wherein decantation is performed with the water having pH of between 5 and 8 in the step of wet-cleaning.

* * * * *